Aug. 19, 1969   D. F. NELSON   3,462,711
ELECTRO-OPTIC DIODE MODULATORS
Filed Aug. 28, 1967
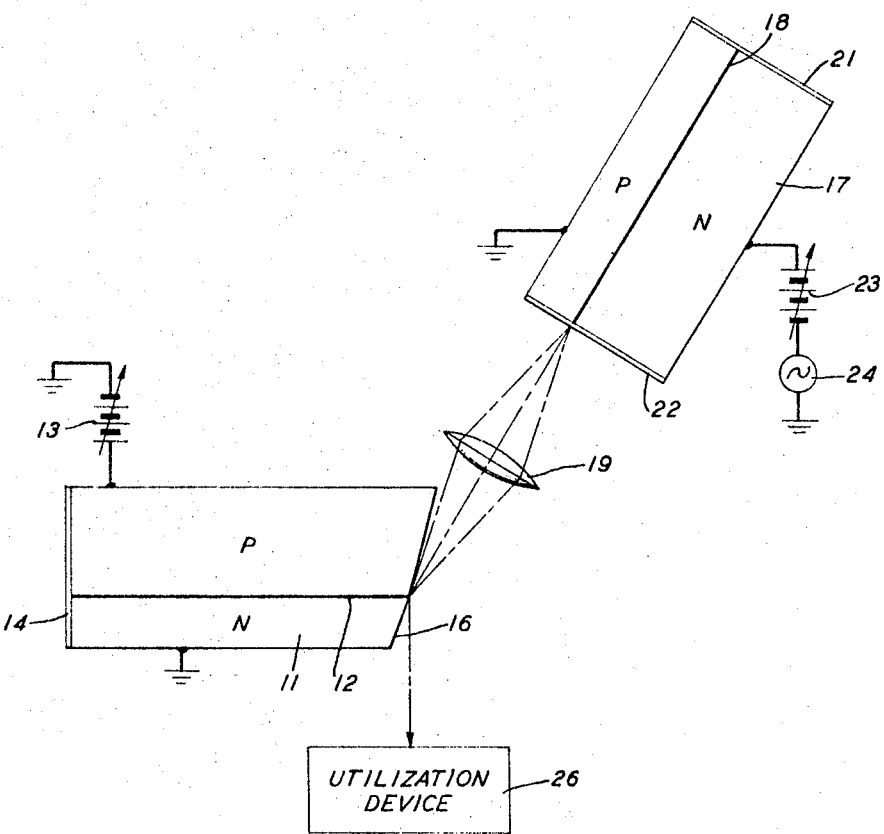
INVENTOR
D. F. NELSON
BY
ATTORNEY United States Patent Office 3,462,711
Patented Aug. 19, 1969

3,462,711
ELECTRO-OPTIC DIODE MODULATORS
Donald F. Nelson, Summit, N.J., assignor to Bell Telephone Laboratories, Incorporated, Murray Hill, N.J., a corporation of New York
Filed Aug. 28, 1967, Ser. No. 663,689
Int. Cl. H01s 3/02
U.S. Cl. 332—7.51     8 Claims

ABSTRACT OF THE DISCLOSURE

An internal resonator coupling modulator for laser light utilizes the Pockels effect to vary the amount of light reflected from a Brewster angle facet of the laser, thereby varying the light coupled out. Over a specific range of phase change or retardation by the modulator, the light output is frequency modulated.

BACKGROUND OF THE INVENTION

This invention relates to light modulation and, more particularly, to electro-optic modulation of laser light.

Various arrangements for modulating the output of a laser have been proposed. One of the simplest arrangements takes the form of a modulating element external to the laser cavity through which the laser beam is passed. The principal drawback to such a system lies in the fact that the light beam only makes one passage through the modulator, hence the modulator usually requires high powers to be effective. When the modulating element is placed inside the laser resonator, its effectiveness is increased by a factor N, where N is the number of passes the light makes through the element. Thus small powers or voltages can produce substantial modulation of the light. Such modulation schemes are limited, however, by the gain-bandwidth product. Where the modulation is increased by a factor N, the bandwidth available is decreased by the same factor.

One prior art suggestion for overcoming the gain-bandwidth limitation on internal modulation is known as coupling modulation. Basically this involves modulating the coupling of the light out of the side of the resonator, which results in intensity modulation of the output beam. Even this type of modulation has certain limitations, however. The presence of so called Fabry-Perot resonances in the resonator cause a phenomenon known as mode locking when the modulation frequency is a multiple or submultiple of the difference frequency between any two Fabry-Perot resonances. This mode locking characteristic has utility in many applications, but is a decided limitation to linear modulation of a light beam. In general, it has been found that where conditions are optimized, the maximum bandwidth of a coupling modulation arrangement is approximately one-half the difference between resonant frequencies. This bandwidth increases as the laser elements and the modulating element are scaled down in size since the frequency separation between resonances increases with smaller resonators.

SUMMARY OF THE INVENTION

The present invention is an internal coupling modulator which overcomes many of the aforementioned limitations by using a diode laser, such as, for example, a gallium arsenide (GaAs) diode, and an electro-optic (Pockels effect) diode modulator such as, for example, a gallium phosphide (GaP) diode. The use of diodes permits scaling down to a point where the resonator mode separation is several gigahertz, thus permitting a wide modulation bandwidth.

In an illustrative embodiment of the invention, a GaAs diode has one end substantially totally reflective of light energy produced by the diode junction, and the other end cut to the Brewster angle and polished. Means are provided for forward biasing the diode to produce laser action, which occurs, as is well known in the art, in the diode junction. A GaP diode having one end substantially totally reflective is situated in proximity to the laser diode and positioned such that light emerging from the Brewster angle face is directed into the GaP diode junction. Means are provided for reverse biasing the GaP diode and for applying modulating signals thereto. In operation, light from the laser diode travels along the junction of the modulator diode to the reflecting end where it is reflected back along the junction and into the laser diode junction. Thus the reflecting end of the laser diode and the reflecting end of the modulator diode define the laser resonator.

As will be discussed more fully hereinafter, with proper orientation of the crystallographic axes of the modulator diode, application of a reverse bias to the modulator produces rotation of the polarization of the laser light. Inasmuch as the diode junction is birefringent, this results in an elliptical polarization. The light returning from the modulator to the laser is then partially reflected out of the resonator by the Brewster angle face, and partially transmitted into the laser diode. Variations in the reverse bias, as by a signal, produce corresponding variations in the reflected component of the light.

A principal feature of the present invention is that under certain conditions, to be discussed hereinafter, the output of the laser-modulator arrangement is a frequency modulated light beam instead of an intensity modulated beam.

This and other principles and features of the present invention will be more readily understood from the following detailed description, taken in conjunction with the accompanying drawing.

DESCRIPTION OF THE DRAWING

The figure is a diagrammatic view of an illustrative embodiment of the present invention.

DETAILED DESCRIPTION

The figure depicts a light generator-modulator combination embodying the principles of the present invention. The internal coupling modulator arrangement of the figure comprises a laser diode 11 of suitable material such as GaAs having a lasing junction 12 producing light when biased in the forward direction by biasing means 13. One end of diode 11 is lapped and polished or cleaved and coated to form a reflecting surface 14 and the other end 16 is lapped and polished to the Brewster angle as shown.

A modulator diode 17, of, for example, GaP, is located adjacent to diode 11 and oriented so that light emerging from junction 12 through face 16, can be focused on the junction 18 of diode 17 by suitable focusing means 19. The end of diode 17 remote from diode 11 is lapped and polished and coated to form a reflecting surface 21. The other end 22 of diode 17 is preferably coated with an antireflection coating. The surfaces 14 and 21 define the laser resonator, which, because of the small size of the diodes, has a relatively large mode spacing. Obviously the resonator may be defined by other suitable means at some loss in compactness.

Diode 17 is reverse biased by suitable means 23, and a source 24 of modulating signals is connected in circuit therewith.

In operation, application of sufficient forward bias to diode 11 causes laser oscillations to occur. As is well known, junction 12 functions as a waveguide to these oscillations, which emerge from junction 12 through face 16 and are directed into and along junction 18 of diode 17 to mirror 21, where they are reflected back along junction 18 and directed into junction 12 through face 16. As shown in the drawing, the orientation of surface 16 favors oscillation in the || polarization (the optical electric field E parallel to the plane of the drawing). In the absence of any phase shift by the diode modulator, light of other polarizations is held to a minimum due to the reflecting characterisic of surface 16 for all but the parallel polarization.

When a biasing voltage is applied to modulator diode 17, the polarization of the light traveling along junction 18 is converted from a parallel polarization to an elliptical polarization as a result of the electro-optic effect of junction 18. A small such effect exists even at zero bias on the modulator due to the built-in electric field in the junction. This effect is maximized for the configuration of the figure when two of the induced principal optic axes of diode 17 are at 45° to the junction plane and one induced principal optic axis is both in the plane of the junction and the plane of the drawing. This orientation of axes occurs, for example, when the junction electric field is in the [110] crystallographic direction of GaP. The light, as it emerges from diode 17 has both a parallel component and a perpendicular component (E perpendicular to the plane of the drawing). The Brewster angle surface 16 transmits the parallel polarization but reflects a large portion of the perpendicularly polarized light out of the resonator where it may be detected or otherwise utilized in a suitable utilization device 26. Because of the large index of refraction of GaAs ($n=3.6$), the reflectivity of surface 16 for the perpendicular component of the light is 0.734. Thus this surface produces an efficient output coupling, and the amount or intensity of the light thus coupled out can be varied by variations in the field applied to diode 17 from sources 23 and 24.

A principal feature of the present invention is based upon the fact that not all of the perpendicularly polarized light is coupled out, some of it being returned to the laser diode 11. It has been found that as more of the light energy is converted to the perpendicular polarization, more energy is lost to the parallel polarization, and hence the parallel polarization oscillation threshold rises. At the same time, more energy in the perpendicular polarization is fed back into laser diode 11, hence the oscillation threshold of a second mode in which the perpendicular polarization is dominant decreases. At a particular value of electric field applied to junction 18 of diode 17, measured in terms of the phase shift introduced by diode 17, the thresholds for the two oscillatory modes are the same. Specifically, this occurs when $$\cos \Delta P = \frac{2T^{1/2}}{(1+T)} \quad (1)$$

where $\Delta P$ is the phase difference or retardation introduced by the modulator and $$T = \frac{4n^2}{(1+n^2)^2} \quad (2)$$

where $n$ is the index of refraction of the laser diode junction. The phase difference $\Delta P$ is given by $$\Delta P = \frac{\omega h(n_2 - n_1)}{C} \quad (3)$$

where $\omega$ is the angular frequency of the light, $h$ is the length of the diode modulator, and $n_1$ and $n_2$ are the two indices of refraction characteristic of the Pockels effect, the basis upon which the modulator diode is operated.

In the arrangement of the figure T has the value 0.266 for an index of refraction of 3.6, which is characteristic of GaAs at $0.84\mu$ wavelength.

The oscillatory thresholds for the two modes remain the same, as do their amplitudes and gains until $$\cos \Delta P = \frac{-2T^{1/2}}{(1+T)} \quad (4)$$

provided that the gain of the laser is essentially independent of frequency for frequency changes of a mode up to the Fabry-Perot mode difference frequency. This is true of GaAs laser diodes. Over the range defined by Equations 1 and 4, phase changes in the modulator produce changes in the "round trip" phase which is the sum of the phases introduced by the end mirrors, the absorption coefficient of the laser transition, the loss coefficient due to the scattering and free carrier absorption, the air space between the two diodes, the focusing element, and the indices of refraction of the diodes. As a consequence, the frequencies of the two modes change with changes in field applied to the modulator diode, and frequency modulation results. Device 26, over this range is a frequency modulation sensitive device.

While the frequency modulation regime has been discussed in terms of the arrangement of the figure, other types of internal cavity electro-optic arrangements can be made to function in a similar manner, provided a portion at least of both polarizations are fed back to the laser. The mathematical development leading to Equations 1 through 4 is quite complex, although straightforward, and, as a consequence, has not been included. Such a development applies not only to the arrangement of the figure, but to any laser-modulator combination using internal cavity coupling modulation depending upon the Pockels effect, and utilizing a Brewster angle coupling.

The arrangement of the figure constitutes an amplitude or intensity modulator up to the lower limit of the frequency modulation regime as defined by Equation 1, and between the limits defined by Equations 1 and 4, as a frequency modulator. Operations at the different regimes are governed by the amount of field applied to the modulator. In addition, the arrangement of the figure may be utilized as a mode locked laser by modulating at a signal frequency equal to the cavity mode spacing. The intensity modulation regime is capable of producing 50% modulation depth over a bandwidth of from 1 to 3.5 gHz., and the frequency modulation regime has a similar bandwidth. Pulse code modulation at rates of 1 gigabit per second are also possible. In the mode locked regime, pulses of approximately one picosecond duration and 0.3 nanosecond separation can be realized. All of these regimes are operated at approximately 0.1 w. dissipation in the modulator.

What is claimed is:

1. An internal resonator laser modulator arrangement comprising
    a laser resonator,
    laser means within said resonator for generating stimulated coherent radiation, and
    means within said resonator for frequency modulating the output of said laser means comprising an electro-optic effect modulator in the path of the radiation generated by said laser means, said modulator being effective to convert the polarization of the radiation from parallel to elliptical,
    said laser means having one face disposed at Brewster's angle to reflect out of said resonator a portion of the elliptically polarized radiation which is of perpendicular polarization and to transmit back into said laser means a remaining portion of the radiation having perpendicular polarization.

2. An internal resonator laser modulator arrangement as claimed in claim 1 and further including means for utilizing the frequency modulated output of said system.

3. An internal resonator laser modulator arrangement as claimed in claim 1 wherein said laser means comprises a diode laser and said means for frequency modulating the output comprises a diode modulator.

4. An internal resonator laser modulator arrangement as claimed in claim 3 wherein said diode laser is of gallium arsenide and said diode modulator is of gallium phosphide.

5. In combination, means defining an optical cavity resonator, a laser member within said resonator, means for producing stimulated coherent radiation in said laser member, an electro-optic modulator member within said resonator in the path of the radiation emerging from said laser member, said modulator being effective to convert the polarization of the radiation from parallel to elliptical, output coupling means for extracting a portion of the radiation from said resonator comprising a Brewster angle face on said laser member to reflect out of said resonator a portion of the elliptically polarized radiation of perependicular polarization and to transmit back into said member a remaining portion of the radiation having perpendicular polarization, means for operating the combination of said laser member and said modulator member in one of a number if discrete modulation regimes defined by the phase retardation $\Delta P$ of said modulator member, the regime being one of frequency modulation when $\Delta P$ falls between limits defined by $$\cos \Delta P = \pm \frac{2T^{1/2}}{1+T}$$

where $$T = \frac{4n^2}{(1+n^2)^2}$$

and $n$ is the index of refraction of said laser member, the regime being one of amplitude modulation when $\Delta P$ is without said limits, and utilization means for receiving the output from said Brewster angle face.

6. The combination of claim 15 wherein the phase retardation of said modulator member falls between said limits and said utilization means is sensitive to frequency modulations of the output radiation.

7. The combinaton as claimed in claim 5 wherein said laser member is a laser diode and said modulator member is a diode.

8. The combination as claimed in claim 5 wherein said laser member is a gallium arsenide diode and said modulator member is a gallium phosphide diode.

References Cited

UNITED STATES PATENTS 3,301,625  1/1967  Ashkin et al. _____ 332—7.51

JOHN KOMINSKI, Primary Examiner

DARWIN R. HOSTETTER, Assistant Examiner

U.S. Cl. X.R.

331—94.5